United States Patent Office 3,508,645
Patented Apr. 28, 1970

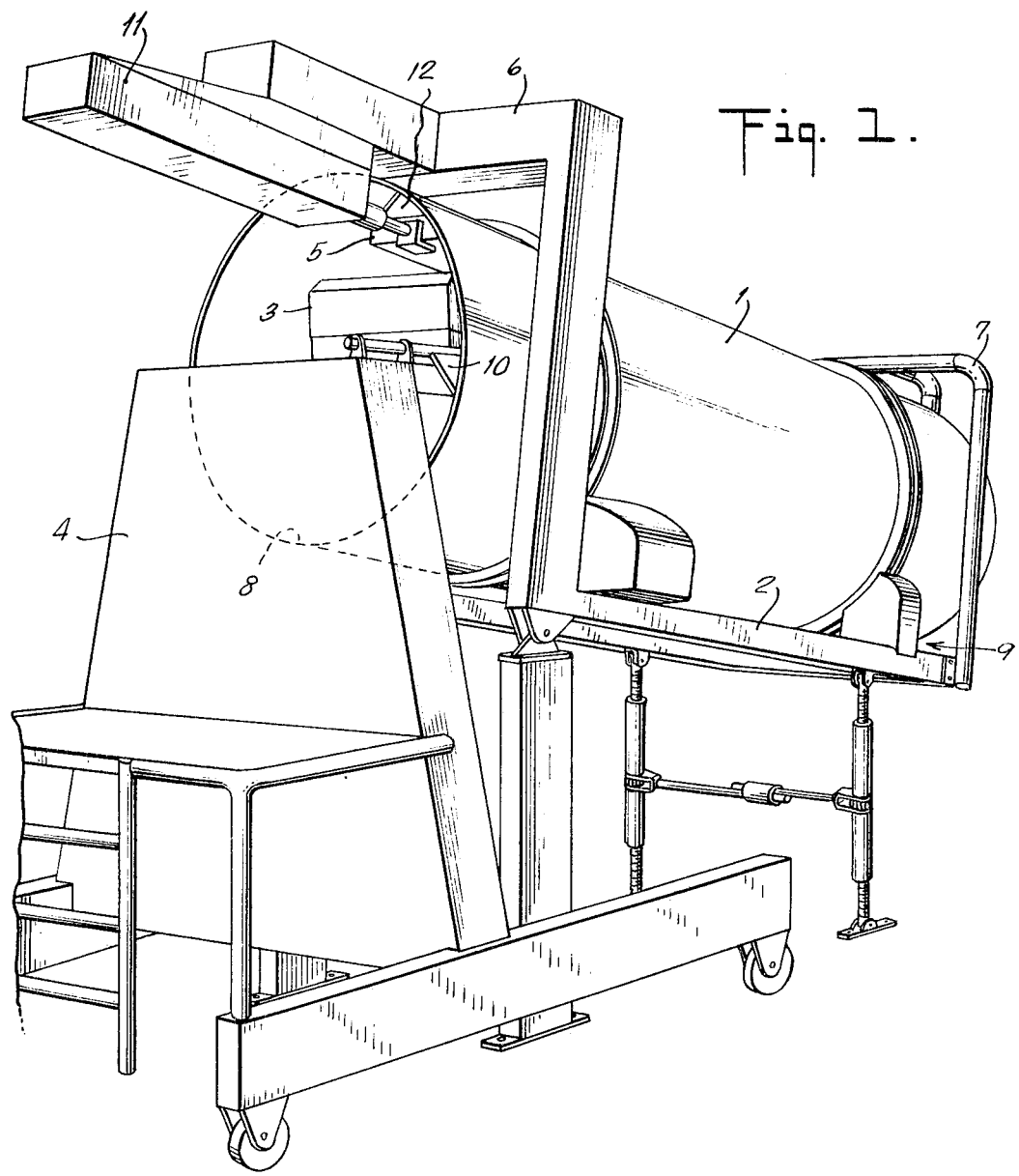

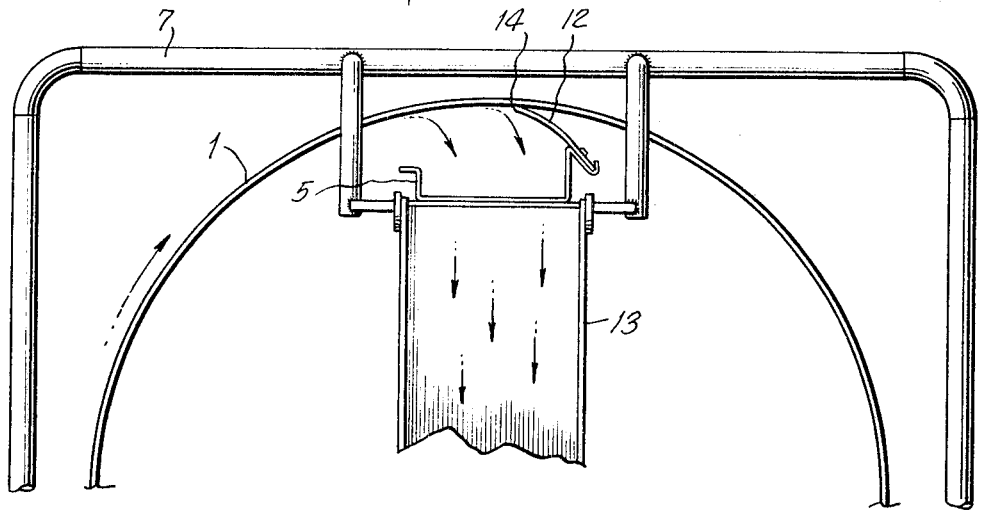
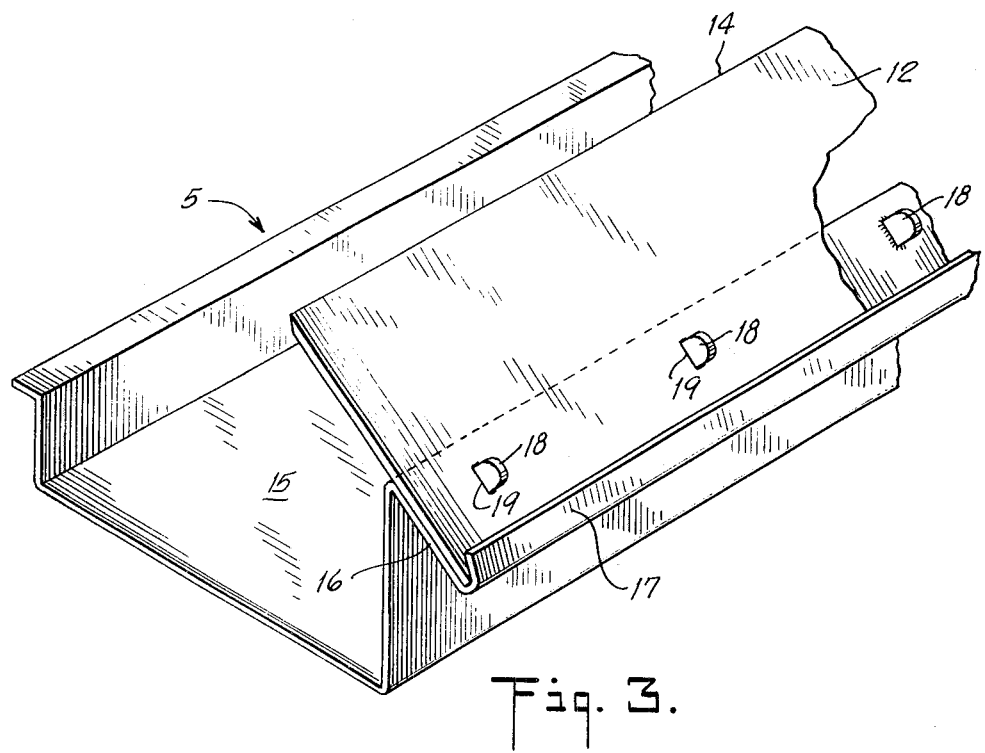

3,508,645
SCRAPER MOUNT FOR ADHESIVE FRICTION SEPARATOR
Lucas J. Conrad, Winston-Salem, N.C., assignor to R. J. Reynolds Tobacco Company, Winston-Salem, N.C., a corporation of New Jersey
Filed Aug. 21, 1968, Ser. No. 754,233
Int. Cl. B07b 13/00
U.S. Cl. 209—2                 4 Claims

ABSTRACT OF THE DISCLOSURE

A means for mounting a scraper blade used to remove material adhering to the surface of an adhesive friction separator for transfer to a friction conveyor wherein the scraper blade is attached to an extension on one edge of the reciprocating friction conveyor for movement therewith thus preventing material build-up on the scraper blade and forming an integral composite unit which facilitates cleaning and maintenance.

Background of the invention

The present invention relates to the food processing art and more particularly to an improved means for mounting a scraper blade in an adhesive friction separator system.

In the food processing industry it is frequently necessary to disunite and separate various edible portions of a particular product from inedible components such as meat from bones and fruit from seeds and pits. Various machines have been designed for accomplishing this separation and thereafter sorting the components. A particular machine utilizing the differences in the adhesive friction qualities of the various parts is disclosed in the copending patent application of Cyrus A. Alldred, Jr., et al., Ser. No. 679,498, filed Oct. 31, 1967, now abandoned in favor of continuation application Ser. No. 824,381, filed May 8, 1969 and assigned to the assignee of the present application. In this adhesive friction separator the mixture of separated parts is deposited on a conveying surface, such as the interior surface of a rotating drum. The separated portions of the product having high coefficients of adhesive friction, which are usually the edible parts, stick to the conveying surface while the inedible portions such as bones and pits of low coefficients of adhesive friction slide on the surface and thus collect at a low point in the path of surface movement for removal. The edible adhesive portions stick to the inner surface of the drum and are carried to the top, where they fall or are scraped from the drum surface and drop to a conveyor extending longitudinally through the drum.

The machine shown in the Alldred embodiment had the scraper mounted above the friction conveyor in engagement with the separator surface. In this location the scraper blade interrupts the passage of the products on the surface, overcoming the adhesive forces, and causing the products to drop onto the surface of the friction conveyor below. With this type of arrangement, it will be understood that the sticky products tend to adhere to the surface of the scraper blade causing a build-up of material thereon and requiring frequent cleaning of this element. Furthermore, since health regulations require regular washing and cleaning of food processing machinery, it is necessary to dismantle such apparatus for cleaning perhaps three or four times during an operating day. This dismantling requires a shut-down time which is significant from the standpoint of product output.

Summary of the invention

The scraper mount of the present invention acts to prevent product build-up on the scraper blade and also facilitates the periodic dismantling and washing so as to greatly increase operating efficiency of the overall apparatus. For that purpose, the scraper blade is mounted directly on one side of the conveyor, which is a longitudinally oscillating friction conveyor. The conveyor with the attached scraper blade may then be drawn as a unit out of the separator drum for maintenance and cleaning. Furthermore, the oscillating motion of the scraper blade with the friction conveyor breaks the adhesive products loose from the scraped surface preventing the undesirable material build-up.

It is therefore an object of the present invention to provide an improved adhesive friction separator apparatus particularly incorporating an improved scraper mount which facilitates cleaning and operation of the apparatus and thus results in more efficient and economical operation. The scraper mount will be described particularly in association with an apparatus used for separating chicken meat from chicken bones but it will be understood upon consideration of the description that the present invention is readily adaptable for use in other separating applications which are well known to those skilled in the art.

Brief description of the drawings

FIG. 1 is a perspective view of an adhesive friction separator including the improved scraper mount of the present invention;

FIG. 2 is a view of the upper portion of the apparatus of FIG. 1, taken from the right end as seen in FIG. 1, showing the friction conveyor and the improved scraper mount; and FIG. 3 is a perspective view of the details of construction of the means for mounting the scraper blade on one side of the friction conveyor.

Detailed description

FIG. 1 shows a drum 1 mounted for rotation on a suitable frame 2; a means 3 for disuniting the chicken parts; a suitable platform 4 on which the disuniting means 3 is mounted and on which an operator may stand to introduce the chicken parts into the disuniting means 3 and which is positioned so that the disuniting means 3 is located within the upper end of the drum 1; and a shuffle or friction conveyor 5 which is mounted on upstanding frames 6 and 7 and extends through the interior of the drum near the top.

The drum 1 and frame 2 are disclosed in greater detail in the copending application of Conrad and Everhart, Ser. No. 761,179, filed Sept. 20, 1968, and assigned to the assignee of the present application. The disuniting means or disuniter 3 acts to remove the chicken meat from the bones and may be of a type such as disclosed in the copending application of Conrad and Alldred, Ser. No. 759,709, filed Sept. 13, 1968, and assigned to the assignee of the present application. The shuffle or friction conveyor 5 may be of the type disclosed in the copending application of Conrad et al., Ser. No. 761,029, filed Sept. 20, 1968, also assigned to the same assignee as the present application.

In operation, the chicken parts which have been inserted in the disuniter 3 drop as a conglomerate mixture of separated meat and bone parts onto the lower interior surface 8 of the rotating drum 1. The sticky meat particles adhere to the surface of the drum 1 and are carried by it while the bone elements which have a much lower coefficient of friction will tend to slide on the surface remaining in the lower portion 8 of the drum 1. It will be noted that the axis of the drum 1 is tilted with respect to the horizontal so that the bones will tend to slide along the bottom part of the drum and drop out of the lower right hand end 9. The sticky meat adhering to the surface of the drum 1 is carried upward by drum rotation to be deposited on the friction conveyor 5. An auxiliary scraper 10 is mounted on the platform 4 alongside the disuniter 3 so that no parts are carried upwardly and dropped on the disuniter itself, but are moved along down the sloping drum 1 to be carried upward to a point above the surface of the friction conveyor 5. The reciprocating drive means for the friction conveyor 5 is contained in the housing 11.

As seen in FIG. 2, the movement of the meat with the surface of the drum 1 is interrupted by a scraper blade 12 which breaks the adhesive bond between the meat and the surface causing the meat particles to be dropped by gravity onto the surface of the friction conveyor 5 beneath. The drive means of the friction conveyor 5, shown at 11 in FIG. 1, imparts a reciprocal motion to the friction conveyor 5 which causes the meat parts to advance along the conveyor surface until reaching and dropping from the end thereof onto a suitable transport chute 13 which carires them for further processing.

As previously mentioned, it is required to dismantle and wash the overall apparatus perhaps three or four times during an operating day. It will thus be realized that the structural arrangement of the various parts of the machine should be such as to facilitate rapid dismantling and cleaning, as well as ready reassembly, to maintain a reasonable operating efficiency. In the structural arrangement shown in FIG. 1, the platform 4 may be rolled away from the drum 1 taking the disuniter 3 and auxiliary scraper 10 with it and making them available for rapid cleaning. The friction conveyor 5 is also separately mounted for quick removal from the drum 1 making it readily available for cleaning. In the past, the scraper blade 12 was separately mounted on frame 6 in engagement with the upper interior surface of the drum 1 and had to be separately removed for this cleaning operation. The improved scraper mount of the present invention, however, in attaching this scraper blade 12 is an improved manner to the edge of the friction conveyor 5 reduces the time and trouble required for removing and cleaning this element 12 while also permitting it to be oscillated so as to prevent a build-up of the sticky material on its surface.

A preferred construction of the imroved scraper mount of the present invention is shown in FIG. 3. The scraper blade 12 is an elongated strip of flexible but comparatively rigid plastic, e.g., nylon. Its upper edge 14 is positioned for yieldable contact with the inner surface of the drum 1. One side of the friction conveyor pan 15 is constructed with a flange 16 extending along its length upon which the scraper blade 12 is disposed to rest. The outer edge of the flange 16 has an inturned portion 17 forming a channel for receiving the lower edge of the scraper blade 12 and providing reactive forces against the action of the drum surface at the opposite edge 14 holding the scraper blade 12 in position. One or more suitable lugs or retaining pins 18 are formed or welded on the surface of the flange and extend through cooperating holes 19 or openings in the surface of the scraper blade 12. These pins 18 hold the blade 12 against longitudinal movement with respect to the flange 16 and communicate the reciprocatory motion of the pan 15 to the blade 12.

When the apparatus is dismantled for cleaning, after the conveyor 5 is withdrawn from the drum 1, the scraper blade 12 may be readily removed from the edge of the pan 15 by lifting the upper edge of the blade and turning it about its lower edge as a pivot until it clears the lugs 19. It thus may be quickly and separately cleaned and rapidly remounted on the conveyor pan 15 and is held securely thereon during the scraping operation. Furthermore, the scraper blade 12 and its support are simple, easily cleaned structures, and are thus free from "germ hotels."

It will thus be seen that an improved mounting means is disclosed for scraper blades used to remove material adhered to the surface of an adhesive friction separator for transfer to a friction conveyor having a reciprocatory motion, which mounting will prevent material build-up on the scraper and facilitate cleaning and maintenance of this element and the overall apparatus.

I claim:
1. A separating apparatus for sorting a mixture of foodstuffs by means of the differing coefficients of adhesive friction of the components comprising:
  (a) a rotating drum whose inner surface separates the components in the mixture of foodstuffs in accordance with the inherent friction properties of the components, the more adhesive components adhering to said inner surface;
  (b) an elongated conveyor positioned in said drum for receiving the more adhesive components of said separating material which adhere to the surface of the drum and for transporting said components out of the drum;
  (c) means for imparting oscillatory motion to said conveyor;
  (d) transfer means having an edge positioned to interrupt the movement of said components with the surface of the drum overcoming the adhesive forces between the components and said surface and transferring the components to said conveyor;
  (e) means on the conveyor for supporting said transfer means;
  (f) means on the conveyor engaging said transfer means to impart oscillatory motion thereto for overcoming the adhesive forces between said components and said transfer means;
  (g) said supporting means and said engaging means cooperating to permit said transfer means to be disengaged from said conveyor solely by lifting.

2. Apparatus as in claim 1 wherein said transfer means comprises an elongated plastic blade.

3. Apparatus as in claim 1 wherein said supporting means comprises a flange on one side of said conveyor having an edge in the form of a channel for receiving the edge of said transfer means opposite said interrupting edge.

4. Apparatus as in claim 1 wherein said engaging means comprises a plurality of lugs on said conveyor which are received in apertures in said transfer means.

References Cited

UNITED STATES PATENTS

| 1,458,467 | 6/1923 | Dolbear | 209—47 |
| 1,534,481 | 4/1925 | Alston. | |
| 2,831,210 | 4/1958 | De Vaney | 18—1 |
| 3,042,208 | 7/1962 | Holmes | 209—452 X |

FRANK W. LATTER, Primary Examiner

U.S. Cl. X.R.
209—45, 452